US007219581B2

(12) United States Patent
Tulloch et al.

(10) Patent No.: US 7,219,581 B2
(45) Date of Patent: May 22, 2007

(54) ADJUSTMENT TOOL

(75) Inventors: Tommy Tulloch, Fife (GB); Steve Buchan, Perth (GB); Richard Dempster, Fife (GB); Ralph Brooker, Alexandria, VA (US)

(73) Assignee: Andrew Corporation, Westchester, IL (US)

(*) Notice: Subject to any disclaimer, the term of this patent is extended or adjusted under 35 U.S.C. 154(b) by 100 days.

(21) Appl. No.: 11/161,632

(22) Filed: Aug. 10, 2005

(65) Prior Publication Data

US 2007/0034059 A1 Feb. 15, 2007

(51) Int. Cl.
*B25B 13/28* (2006.01)
*B25B 13/32* (2006.01)
*B23B 5/22* (2006.01)
*B23B 5/34* (2006.01)

(52) U.S. Cl. .............................. 81/112; 81/116; 81/117; 279/51

(58) Field of Classification Search .......... 81/112–117, 81/DIG. 5; 279/43.1, 43.2, 46.2, 46.3, 51–53
See application file for complete search history.

(56) References Cited

U.S. PATENT DOCUMENTS 664,226 A * 12/1900 Meyer ......................... 168/45
1,633,237 A * 6/1927 Whitlow ...................... 29/249
2,320,967 A * 6/1943 Dunkelberger .............. 294/100
2,669,896 A * 2/1954 Clough ........................ 81/128
3,415,217 A * 12/1968 McGrath .................... 116/215
3,445,913 A 5/1969 Piquerez
4,027,619 A 6/1977 Sturhan et al.
4,092,879 A 6/1978 Hernandez
4,520,698 A 6/1985 Martinmaas
4,762,030 A 8/1988 Nguyen
5,207,130 A 5/1993 Payne
5,233,760 A 8/1993 Patterson
5,337,634 A 8/1994 Carnesi
5,740,704 A 4/1998 Payne
6,000,300 A 12/1999 Plamondon
6,098,972 A 8/2000 Klimach et al.
6,341,544 B1 1/2002 Falzone

* cited by examiner

*Primary Examiner*—Joseph J. Hail, III
*Assistant Examiner*—Bryan Muller
(74) *Attorney, Agent, or Firm*—Babcock IP, PLLC

(57) ABSTRACT

An adjustment tool, having a body with a bore extending between a first end and a second end. A shaft is positioned within the bore having a plurality of outward spreading spring fingers coupled to a tool end. A spring biases the shaft towards the second end of the body. A collet coupled to a first end of the body has an inner surface which restricts the spring fingers to a closed position as movement of the shaft towards the second end of the body retracts the spring fingers into the collet. A bubble ring may be coupled to the body. Graduated indicia associated with the bubble ring indicates rotation of the tool for entry of precise rotational adjustments.

16 Claims, 7 Drawing Sheets

ADJUSTMENT TOOL

BACKGROUND OF THE INVENTION

The present invention relates to hand tools, and more specifically to an adjustment tool for adjusting rotatable elements such as nuts, bolts and the like.

Hand tools are commonly used to assemble and or adjust apparatus, for example reflector antennas. Fine adjustments to the antenna(s) orientation with respect to a target signal consume a significant portion of time required during antenna installation and or performance optimization. Typically these adjustments are made local to the antenna, which may be mounted in environmentally exposed locations such as the roof or exterior wall(s) of a building or atop a radio tower.

Common tools such as box and or ratchet wrenches may be used, however because they are not retained upon the nut or bolt under adjustment, these tools represent a significant drop hazard. Also, individual ratchet wrench sockets may unexpectedly separate from the ratchet handle.

During final fine adjustment, only a portion of a rotation and or a specific number of rotations may be desired. Where adjustments are made, for example, in a narrowing range scheme it is desirable to have a clear indication of the magnitude of the previous adjustment to be able to exactly repeat a multiple of it, in either direction. Various prior rotation indication/recordation schemes are complicated when the tool(s) must be either held in place by the user or removed and then reattached after each adjustment, complicating return of the tool to the exact same orientation so that, for example, fractions of a single rotation may be reliably applied and or repeated.

Competition within the tool industry has focused attention upon ease of use, improved safety characteristics, accuracy and reliability. Factors of commercial success also include reduction of manufacturing, materials and assembly costs.

Therefore, it is an object of the invention to provide an adjustment tool that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The invention is described with respect to FIGS. 1-8 in two exemplary embodiments.

Figure 1:
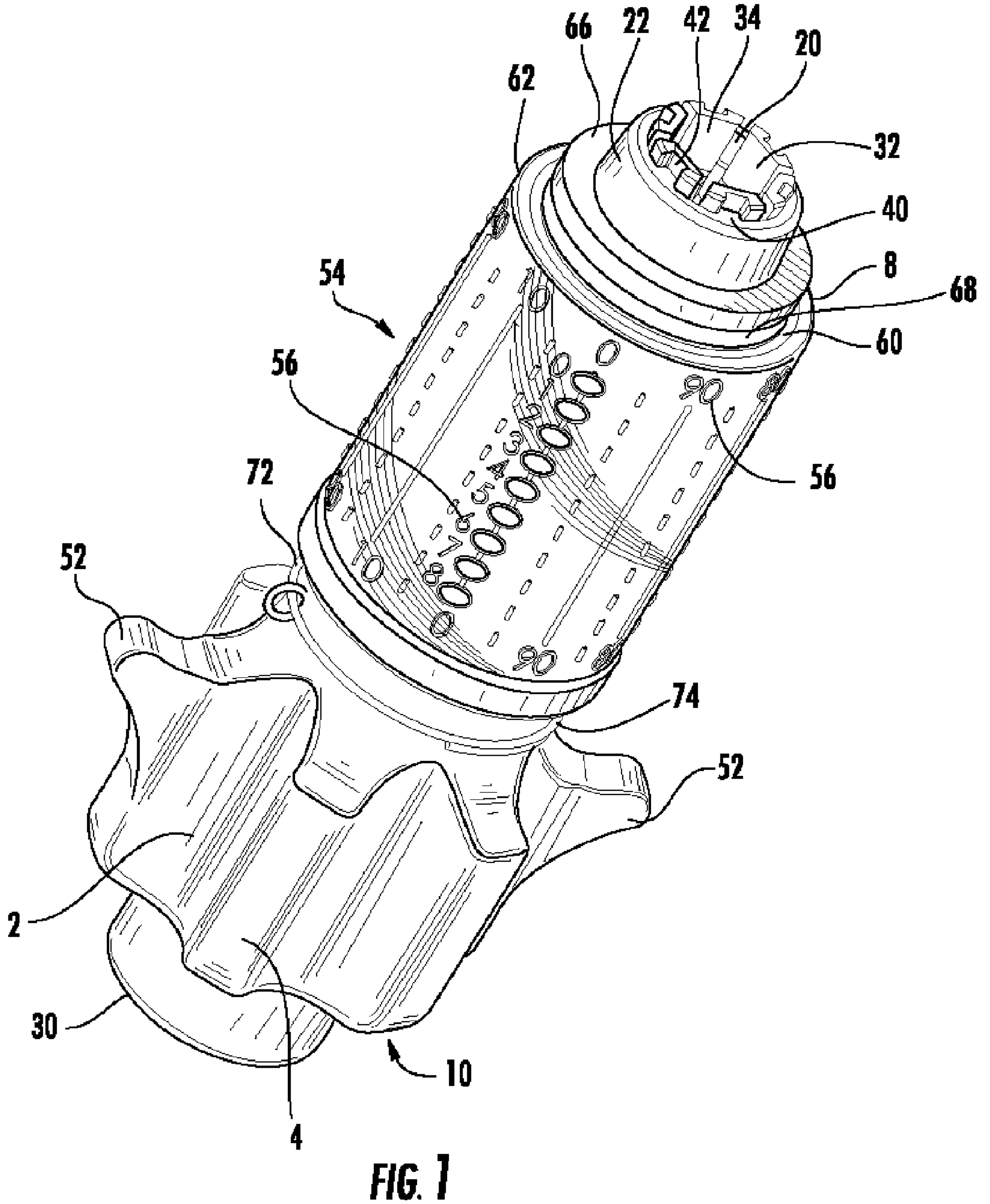
FIG. 1 is an isometric schematic angled side exterior view, of a first embodiment of the invention.
Figure 2:
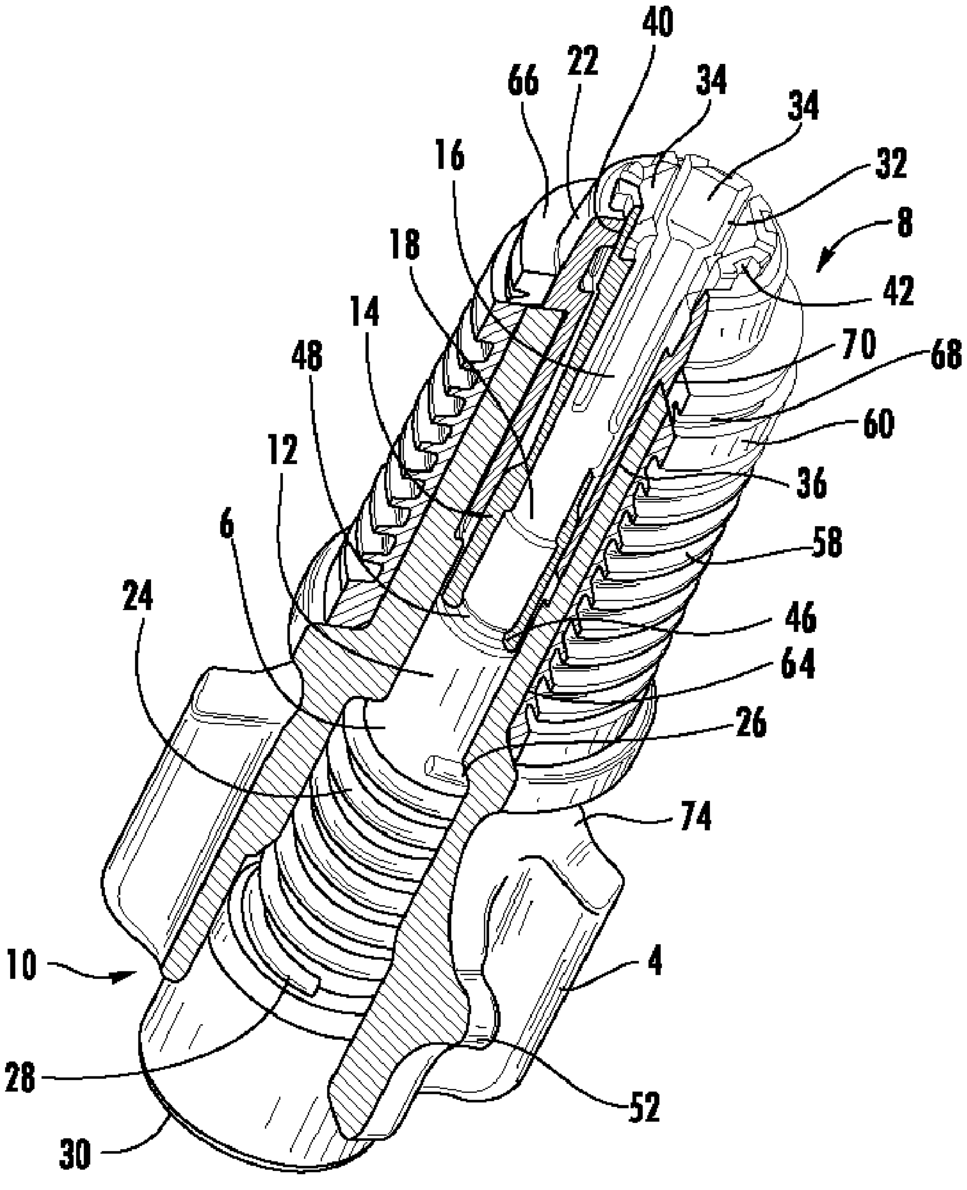
FIG. 2 is an angled isometric view of the first embodiment with the bubble ring cover and a 45 degree section of the body, bubble ring base, gasket, collet and spring finger ring removed for clarity.
Figure 3:
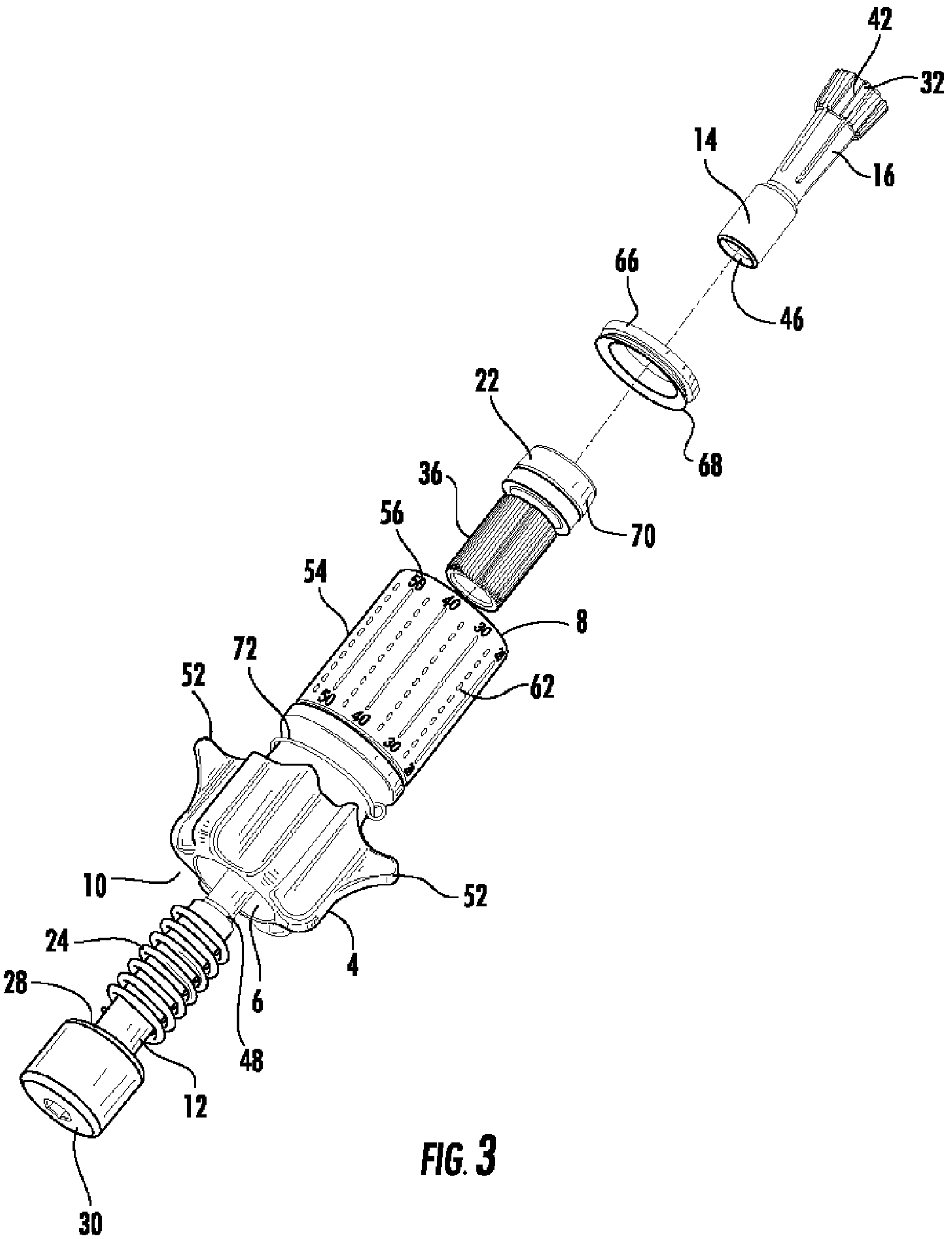
FIG. 3 is an isometric exploded side view of the first embodiment.

As shown in FIGS. 1-3, a first exemplary embodiment of the invention has a body 2 with exterior gripping surfaces 4 adapted for a secure grip by a typical users hand. A bore 6 between a first end 8 and a second end 10 of the body 2 carries a shaft 12. The shaft 12 has a spring finger ring 14 with a plurality of spring finger(s) 16 coupled to a tool end 18. The spring finger(s) 16 spread outward into contact with the inner surface 20 of a collet 22 coupled to the first end 8 of the body 2.

A spring 24 seated between an internal shoulder 26 of the body 2 and an external shoulder 28 proximate an actuator end 30 of the shaft 12 biases the shaft 12 toward the second end 10 of the body 2 thereby retracting the spring finger(s) 16 to a closed position.

Figure 4:
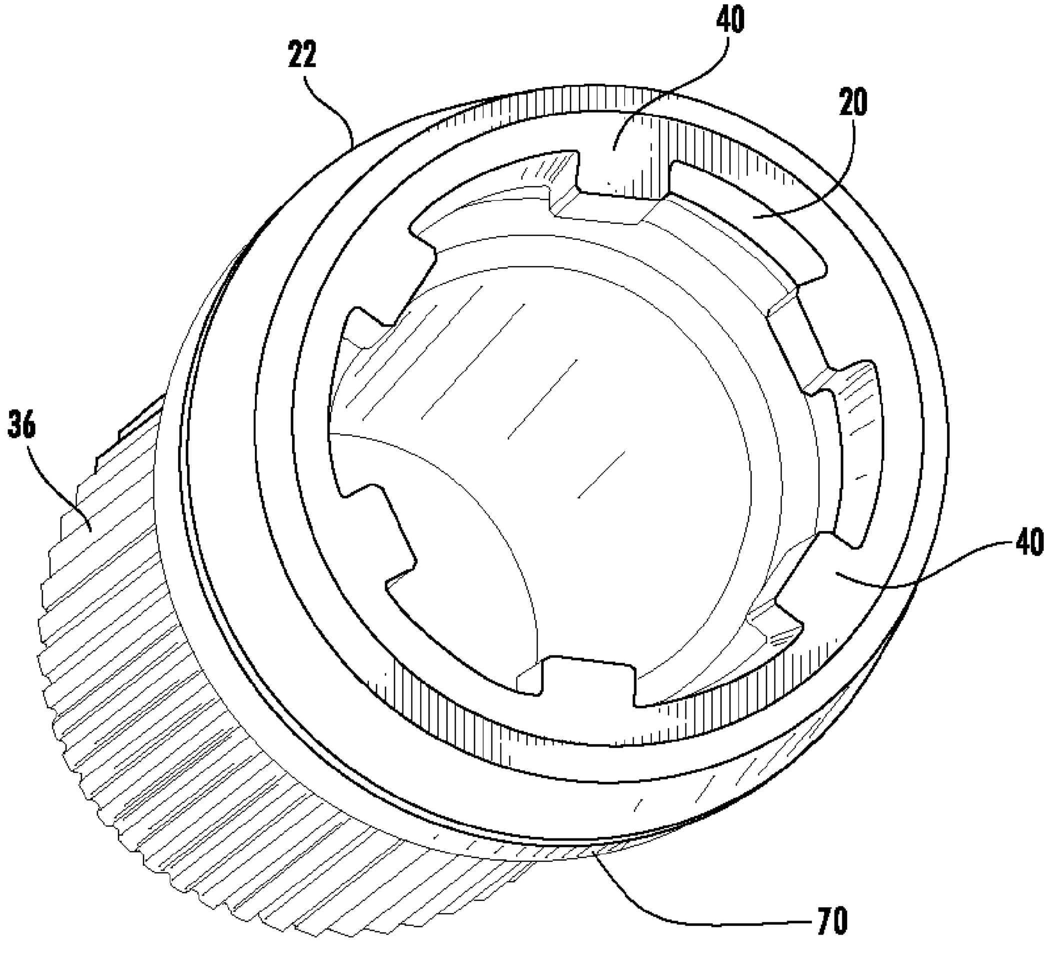
FIG. 4 is an isometric angled end view, of the collet of the first embodiment.
Figure 5:
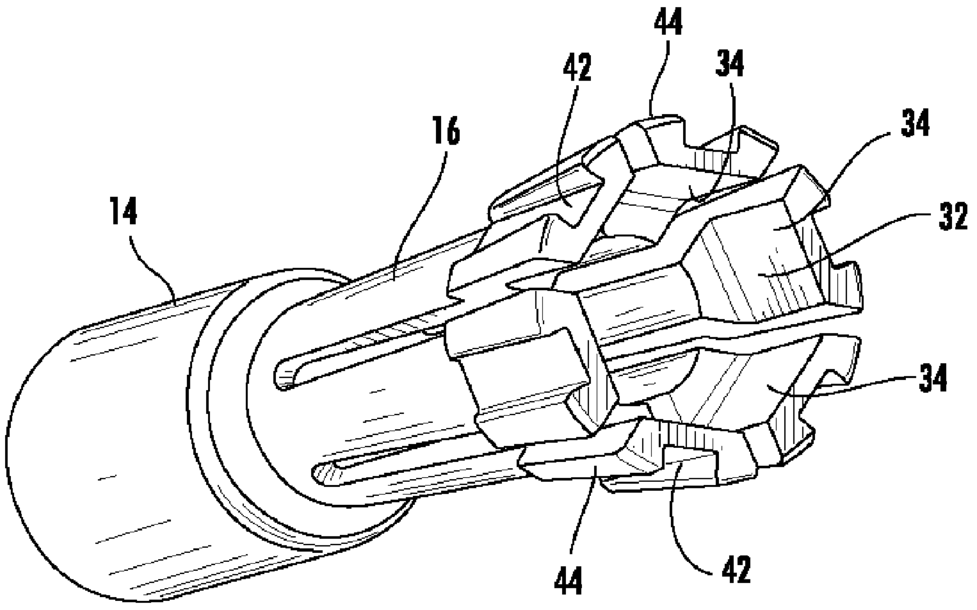
FIG. 5 is an isometric angled end view, of the spring finger ring of the first embodiment.

As best shown in FIGS. 4 and 5 the body 2, collet 22 and spring finger ring 14 are adapted to key together such that rotation of the body 2 is transmitted to a, for example, octagonal gripping surface 32 collectively formed by an inner face 34 of each of the spring finger(s) 16. The collet 22 may be keyed to the body 2, for example, by an interference fit between a plurality of ridge(s) 36 and a corresponding surface of the body 2. Another key, now between the spring finger(s) 16 and the collet 22, is formed by inward projecting tab(s) 40 of the collet 22 inner face 34 that mate with corresponding groove(s) 42 formed in an outer surface 44 of the spring finger(s) 16. The groove(s) 42 are preferably formed parallel to the longitudinal axis of the tool, thereby the spring finger(s) 16 have a range of longitudinal movement according to the position of the shaft 12 within the bore 6, without loosing the key function. Because of the keying between the spring finger(s) 16 and collet 22, the coupling between the spring finger ring 14 and the shaft 12 may be simplified, such as an interference fit between an inward projecting lip 46 of the spring finger ring 14 that mates with a corresponding annular groove 48 proximate the shaft 12 tool end 18.

The gripping surface 32 may be opened or closed by alternately pushing and releasing the actuator end 30 of the shaft 12 to compress the spring 24 between the shaft 12 and the body 2. Because of the interaction between the normally spread apart spring finger(s) 16 and the restriction created by the inner surface 20 of the collet 22, moving the spring finger(s) 16 out of or back into the collet 22 alternates the gripping surface 32 formed by the spring finger(s) 16 between a spread and closed position. Thereby, a desired nut or bolt may be easily placed within the gripping surface 32 and then securely held in place when the spring 24 is allowed to push the shaft 12 back towards the second end 10 of the body 2, retracting the spring finger(s) 16 and closing the gripping surface 32 around the target. Depending upon the selected spring 24 characteristics, when in the closed position, the tool may be reliably held upon the desired target nut or bolt without further support from the user, for example as the user checks the results of the current adjustment.

In addition to providing spring material for the spring finger(s) 16 steady state outward spread, the extension of the spring finger(s) 16 from the spring finger ring 14 forms a central cavity into which a bolt end may pass without bottoming against the tool while the tool is adjusting a nut upon the bolt.

The tool may be enhanced for easy one hand operation by including two or more finger lug(s) 52 among the gripping surface(s) 4 of body 2. As best shown in FIG. 1, the finger lug(s) 52 are preferably arranged so that a users fingers held against the finger lug(s) 52 protruding from the body 2 are situated to oppose action of the users thumb against the actuator end 30 of the shaft 12, as in a typical hypodermic syringe. For the purposes of this description, a syringe action is defined as the common thumb and finger grip/motion used to administer an injection via a hypodermic syringe as the syringe plunger is pressed by the thumb against two or more fingers latched around supports extending from the syringe body.

Figure 6:
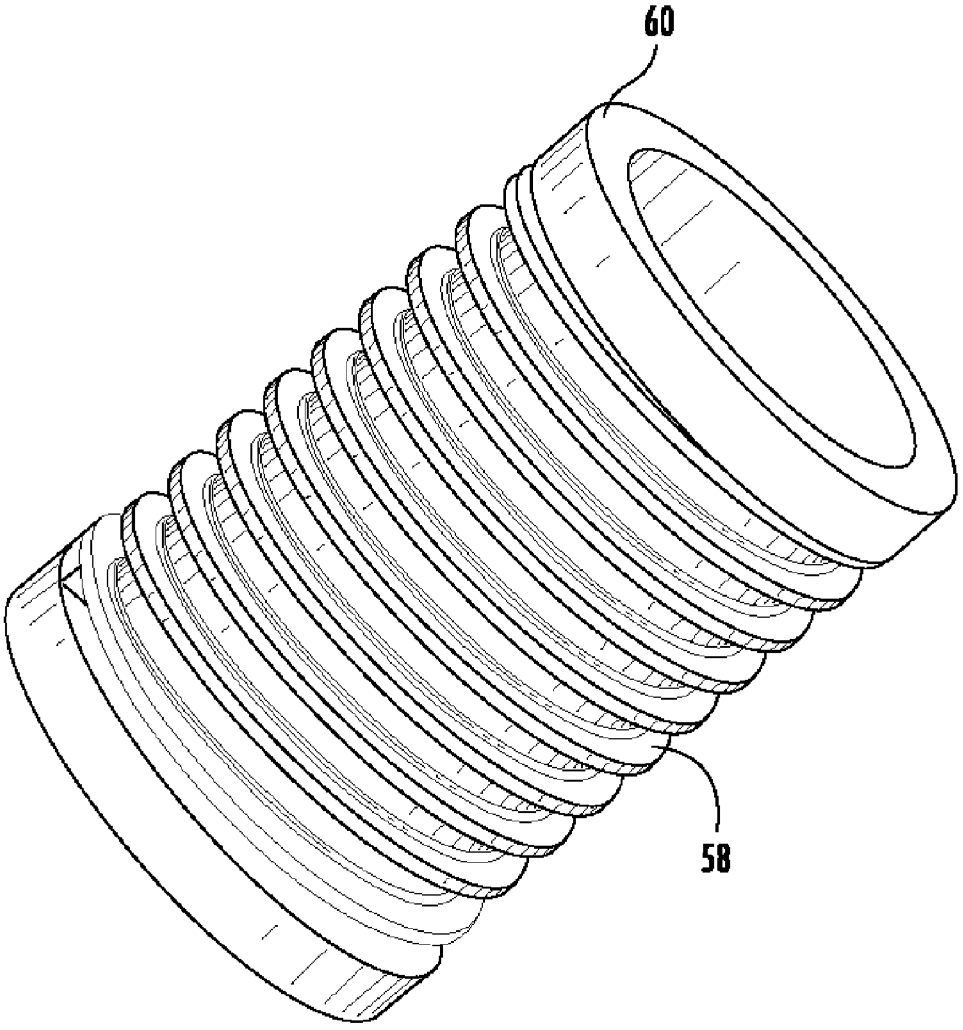
FIG. 6 is an isometric angled side view, of the bubble ring base of the first embodiment.

Rotation indication may be incorporated into the tool by adding a bubble ring 54 with graduated indicia 56. A channel 58 within the bubble ring 54 is partially filled with first material, for example a liquid and the remainder with a second material of a lower density such as a gas that appears through a viewing portion of the bubble ring 54 as a bubble. As the tool is rotated, the bubble moves past the various graduated indicia 56 providing a visual indication of how much rotation has been applied. As best shown in FIG. 6, the bubble ring may be formed with a spiral bubble channel 58 formed in a bubble ring base 60 to allow cumulative indication of multiple rotations. A translucent bubble ring sleeve 62 is then fitted over the bubble ring base 60 to create an enclosed space for the liquid and bubble.

The bubble ring 54 may be rotatably mounted upon an outer ring surface 64 of the body 2, retained for example by a gasket 66 having a lip edge 68 that, depending upon the lateral placement of the gasket 66, for example along an outer diameter 70 of the collet 22, provides a variable level of friction so that the bubble ring 54 does not spin freely but is still manually rotatable about the outer ring surface 64 of the body 2. Thereby, the tool may be mounted upon a desired nut and or bolt head and the bubble ring 54 manually rotated about the body 2 to indicate a zero position before rotation of the body 2 and corresponding nut and or bolt head begins.

One skilled in the art will appreciate that applying the keying between the spring finger(s) 16 and the collet 22 allows the majority of other tool components to be inexpensively manufactured, for example by injection molding using any of a range of plastics, acrylics and or resins, resulting in a relatively light high precision tool having a competitive manufacturing cost.

To minimize drop hazard, the tool may be fitted with a loose retaining ring 72 around an annular retainer groove 74 formed in the body 2 that operates as a tether point to couple the tool to the user. Because the retaining ring 72 is rotatable about the body 2 but otherwise retained upon the body 2, the tool may be used without interference from the attached tether.

Figure 8:
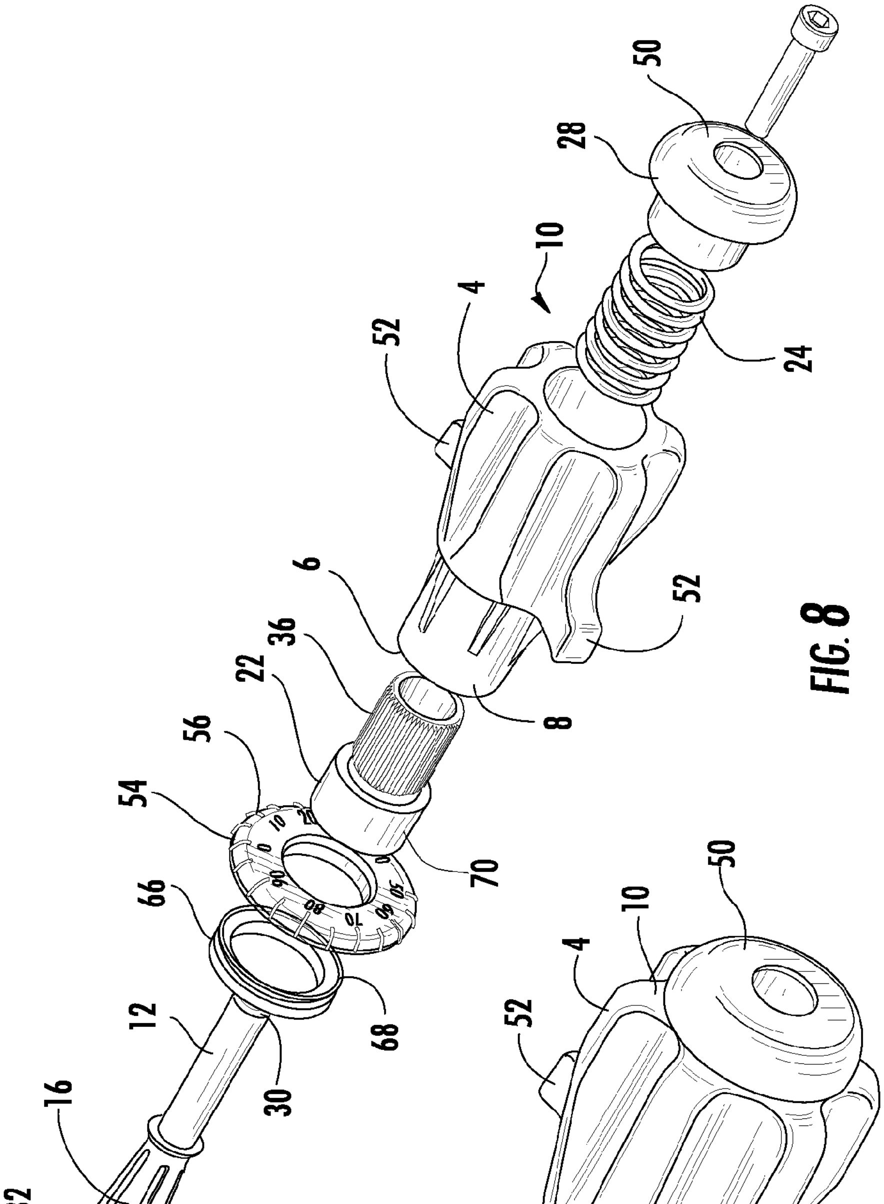
FIG. 8 is an exploded view of the second embodiment.
Figure 7:
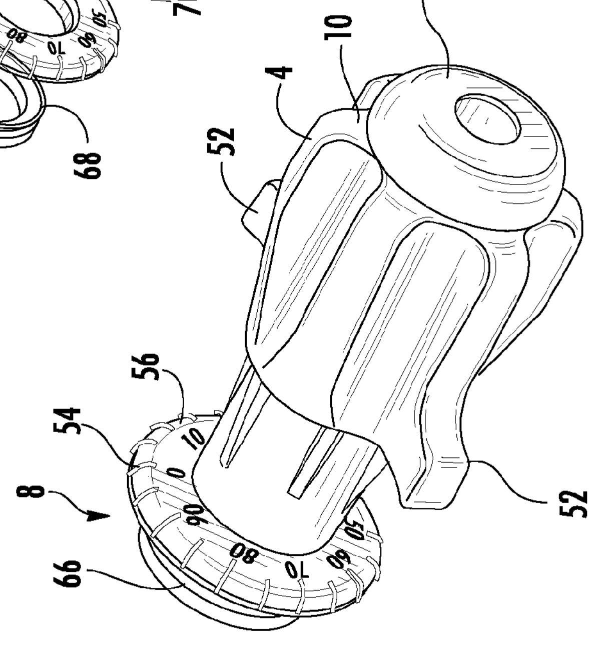
FIG. 7 is an isometric schematic angled side exterior view of a second embodiment.

A second embodiment, like elements similarly notated, relying upon the basic principles of the invention is shown for example in FIGS. 7 and 8. In the second embodiment, the bubble ring 54 is demonstrated as an enclosed single annular channel coupled to the body 2 by mounting upon an outside surface of the collet 22. The shaft 12 is coupled to the spring finger(s) 16 in a single integral component to which a separate actuator end 50 forming the external shoulder 28 is coupled, for example, via a screw.

Although the invention has been demonstrated with respect to the a configuration adapted for use with the common octagonal machine nut and or bolt heads such as an M8 nut, one skilled in the art will appreciate that further embodiments of the invention may include a range of different gripping surface(s) 32 cooperatively formed by the respective desired number of spring finger 16 inner surface (s) 20, for mating with, for example, non symmetrical and or proprietary actuator end, nut and or bolt head configurations.

The invention provides a hand tool optimized for precise adjustment in specific increments, operable if desired by a single hand with the optional convenience of leaving the tool attached to the desired adjusting point between adjustments. The self retaining feature of the invention also enhances the safety of the tool and operator when used in a drop hazard environment.

The precision adjustment indication features of the tool also simplify the design and manufacture requirements of the apparatus under adjustment, eliminating the prior requirement of incorporating environmentally durable precision dial gauges and or pointing elements from the apparatus at each desired adjustment location.

Table of Parts

| | |
|---|---|
| 2 | body |
| 4 | exterior gripping surface |
| 6 | bore |
| 8 | first end |
| 10 | second end |
| 12 | shaft |
| 14 | spring finger ring |
| 16 | spring finger |
| 18 | tool end |
| 20 | inner surface |
| 22 | collet |
| 24 | spring |
| 26 | internal shoulder |
| 28 | external shoulder |
| 30 | actuator end |
| 32 | gripping surface |
| 34 | inner face |
| 36 | ridge |
| 40 | tab |
| 42 | groove |
| 44 | outer surface |
| 46 | inward projecting lip |
| 48 | annular groove |
| 50 | actuator end |
| 52 | finger lug |
| 54 | bubble ring |
| 56 | graduated indicia |
| 58 | channel |
| 60 | bubble ring base |
| 62 | bubble ring sleeve |
| 64 | outer ring surface |
| 66 | gasket |
| 68 | lip edge |
| 70 | outer diameter |
| 72 | retaining ring |
| 74 | retaining groove |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. An adjustment tool, comprising:

a body having at least two finger lugs protruding from an exterior surface of the body;

a bore extending between a first end and a second end of the body;

a collet coupled to the first end of the body;

a shaft positioned within the bore having a plurality of outward spreading spring fingers coupled to a tool end of the shaft;

a bubble ring rotatably mounted upon an outer ring surface of the body, wherein the bubble ring is retained upon the outer ring surface of the body by a gasket seated upon an outer diameter of the collet;

a spring biasing the shaft towards the second end of the body; and an inner surface of the collet restricting the spring fingers to a closed position as movement of the shaft towards the second end of the body retracts the spring fingers into the collet.

2. The adjustment tool of claim 1, wherein at least one of the spring fingers has a groove formed in an outer surface; and the inner surface of the collet has at least one corresponding inward projecting tab dimensioned to fit in the groove; the groove and the tab together keying the spring finger to the collet.

3. The adjustment tool of claim 1, wherein the spring fingers each have an inner face; the inner face(s) forming an hexagonal gripping surface.

4. The adjustment tool of claim 1, wherein the collet has an interference fit with the first end of the body.

5. The adjustment tool of claim 1, wherein the spring is a coil spring mounted upon the shaft abutting an internal shoulder of the bore proximate the tool end and an external shoulder of the shaft proximate an actuator end of the shaft.

6. The adjustment tool of claim 5, further including an end cap coupled to the actuator end of the shaft, the end cap forming the external shoulder.

7. The adjustment tool of claim 1, wherein the finger lugs are arranged on the body whereby a single hand can grasp the lugs and push upon the shaft proximate the actuator end in a syringe action to move the spring fingers to an outward spread open position.

8. The adjustment tool of claim 1, wherein the bubble ring has a spiral bubble channel.

9. An adjustment tool, comprising:

a body having a bore extending between a first end and a second end of the body;

a bubble ring coupled to the body, wherein the bubble ring is retained upon an outer surface of the collet by a gasket;

a collet coupled to the first end;

a shaft positioned within the bore having a plurality of outward spreading spring fingers coupled to a tool end of the shaft;

a spring biasing the shaft towards the second end of the body;

an inner surface of the collet restricting the spring fingers to a closed position as movement of the shaft towards the second end of the body retracts the spring fingers towards the body.

10. The adjustment tool of claim 9, wherein at least one of the spring fingers is keyed to the collet, whereby the spring fingers cannot rotate independent of the body.

11. The adjustment tool of claim 9, wherein the spring fingers are formed extending from a spring finger ring; the spring finger ring coupled to the shaft.

12. The adjustment tool of claim 9, wherein the bubble ring is positioned normal to and coaxial with a longitudinal axis of the shaft.

13. The adjustment tool of claim 12, wherein the gasket comprises a lip edge biasing the bubble ring against the first end of the body.

14. The adjustment tool of claim 12, wherein the bubble ring has a spiral channel, the spiral channel coaxial with the longitudinal axis of the shaft.

15. The adjustment tool of claim 9, further including a retaining ring coupled to and rotatable about the body.

16. An adjustment tool, comprising:

a body having a bore extending between a first end and a second end of the body;

a collet coupled to the first end;

a shaft positioned within the bore;

a plurality of spring fingers extending from a spring finger ring coupled to a tool end of the shaft; at least one of the spring fingers keyed to the collet;

a spring biasing the shaft towards the second end of the body;

an inner surface of the collet restricting the spring fingers to a closed position as the shaft moves towards the second end of the body; and a bubble ring having a spiral channel coaxial with the longitudinal axis of the shaft, the bubble ring rotatably retained upon the an outer ring surface of the body by a gasket, the gasket having a lip edge biasing the bubble ring against the body.

* * * * *